(12) United States Patent
Miyazaki

(10) Patent No.: US 8,441,656 B2
(45) Date of Patent: May 14, 2013

(54) PDL DATA PROCESSING DEVICE

(75) Inventor: Sadaaki Miyazaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 337 days.

(21) Appl. No.: 12/844,438

(22) Filed: Jul. 27, 2010

(65) Prior Publication Data

US 2011/0032558 A1 Feb. 10, 2011

(30) Foreign Application Priority Data

Aug. 7, 2009 (JP) ................................. 2009-184166

(51) Int. Cl.
*G06F 3/12* (2006.01)
(52) U.S. Cl.
USPC ....... 358/1.13; 358/1.14; 358/1.15; 358/1.16; 358/1.17; 345/545; 345/555
(58) Field of Classification Search .................. 358/1.13, 358/1.14, 1.15, 1.16, 1.17; 345/545, 555
See application file for complete search history.

(56) References Cited

U.S. PATENT DOCUMENTS

| | | | | |
|---|---|---|---|---|
| 5,894,545 | A * | 4/1999 | Fukuta | 358/1.16 |
| 6,348,975 | B1 * | 2/2002 | Tsunekawa et al. | 358/1.17 |
| 2004/0143794 | A1 * | 7/2004 | Sugimoto et al. | 715/526 |
| 2008/0024802 | A1 | 1/2008 | Kato | |

FOREIGN PATENT DOCUMENTS

| | | |
|---|---|---|
| EP | 0578264 A2 | 1/1994 |
| JP | 2004-322360 A | 11/2004 |
| JP | 2008033812 A | 2/2008 |

OTHER PUBLICATIONS

"XML Paper Specification", XPS Specification and Reference Guide, Version 1.0, Oct. 18, 2006, pp. 221-233, Retrieved from the Internet: URL:http://www.microsoft.com/whdc/xps/xpsspec.mspx [Retrieved on Feb. 4, 2013].

European Patent Office, extended European Search Report for European Patent Application No. 10251151.6 (counterpart European patent application), dated Feb. 25, 2013.

* cited by examiner

*Primary Examiner* — Jacky X Zheng
(74) *Attorney, Agent, or Firm* — Baker Botts L.L.P.

(57) ABSTRACT

A PDL data processing device may obtain PDL data including plural sets of drawing part data and a set of deletion part data. The set of the deletion part data may include timing information and data information indicating a target set of the drawing part data of a deletion target. The PDL data processing device may store the PDL data in a memory, create drawing data by utilizing the plural sets of the drawing part data, and delete from the memory the target set of the drawing part data indicated by the data information included in the set of the deletion part data, regardless of the timing indicated by the timing information included in the set of the deletion part data, at a specific timing which is subsequent to the timing indicated by the timing information.

13 Claims, 11 Drawing Sheets

PDL DATA PROCESSING DEVICE

CROSS-REFERENCE TO RELATED APPLICATION

This application claims priority to Japanese Patent Application No. 2009-184166, filed on Aug. 7, 2009, the contents of which are hereby incorporated by reference into the present application.

TECHNICAL FIELD

The present specification discloses a technique for processing PDL (Page Description Language) data.

DESCRIPTION OF RELATED ART

PDL data processing devices that create drawing data for printing from PDL data are widely known. For example, a PDL data processing device that creates drawing data from XPS (XML Paper Specification) data is known. The XPS data includes plural sets of drawing part data such as page part data, resource part data, etc. The PDL data processing device creates drawing data by utilizing the plural sets of drawing part data.

SUMMARY

For example, at a timing prior to a start of creation for drawing data of a third page, it is considered preferable to delete a set of drawing part data which is unnecessary for creating drawing data from the third page onward. This is because an amount of a memory used can be reduced. In order to delete the set of drawing part data at the above timing, a configuration can be considered that includes a set of deletion part data in the PDL data. The set of deletion part data includes timing information (e.g., information indicating the third page), and data information indicating a target set of the drawing part data (e.g., the aforementioned set of drawing part data) which is capable of being deleted at a timing indicated by the timing information. According to this configuration, by reading the set of deletion part data, the PDL data processing device can identify the timing at which the aforementioned set of drawing part data is to be deleted, and can delete the set of drawing part data at that timing. However, the timing information included in the set of deletion part data may not be always correct. In a case where a program for creating PDL data contains a defect, the timing information may be described wrongly; the timing information may indicate a timing earlier than the correct timing at which deletion is to be executed. Consequently, e.g., a set of deletion part data may exist that instructs the deletion of the set of drawing part data necessary for creating the drawing data of the third page prior to the creation for drawing data of the third page. If the drawing part data is deleted in accordance with this type of deletion part data, the drawing data of the third page cannot be created utilizing the set of drawing part data.

The present specification discloses a technique for preventing a situation whereby it is impossible to create drawing data by utilizing a set of drawing part data.

One aspect disclosed in the present specification is a PDL data processing device. The PDL data processing device may comprise a PDL data obtaining unit, a storage control unit, a drawing data creation unit, and a deletion unit. The PDL data obtaining unit may be configured to obtain PDL data including plural sets of drawing part data and a set of deletion part data. The set of the deletion part data may include timing information and data information indicating a target set of the drawing part data of a deletion target which is capable of being deleted at a timing indicated by the timing information. The storage control unit may be configured to store the PDL data in a memory. The drawing data creation unit may be configured to create drawing data by utilizing the plural sets of the drawing part data. The deletion unit may be configured to delete from the memory the target set of the drawing part data indicated by the data information included in the set of the deletion part data, regardless of the timing indicated by the timing information included in the set of the deletion part data, at a specific timing which is subsequent to the timing indicated by the timing information.

Moreover, for realizing the PDL data processing device, a control method, a computer program, and a non-transitory computer readable medium storing the computer program, are also novel and have utility.

BRIEF DESCRIPTION OF DRAWINGS

DETAILED DESCRIPTION OF THE PREFERRED EMBODIMENT (First Embodiment) (Configuration of System)
The embodiment will be explained with reference to the figures. FIG. 1 shows a schematic view of a data processing system 2 of the present embodiment. The data processing system 2 comprises a LAN 4, USB memory 6, PC 8, and printer 10. The PC 8 and printer 10 are connected to the LAN 4. The PC 8 and printer 10 can communicate with one another through the LAN 4.

Figure 1:
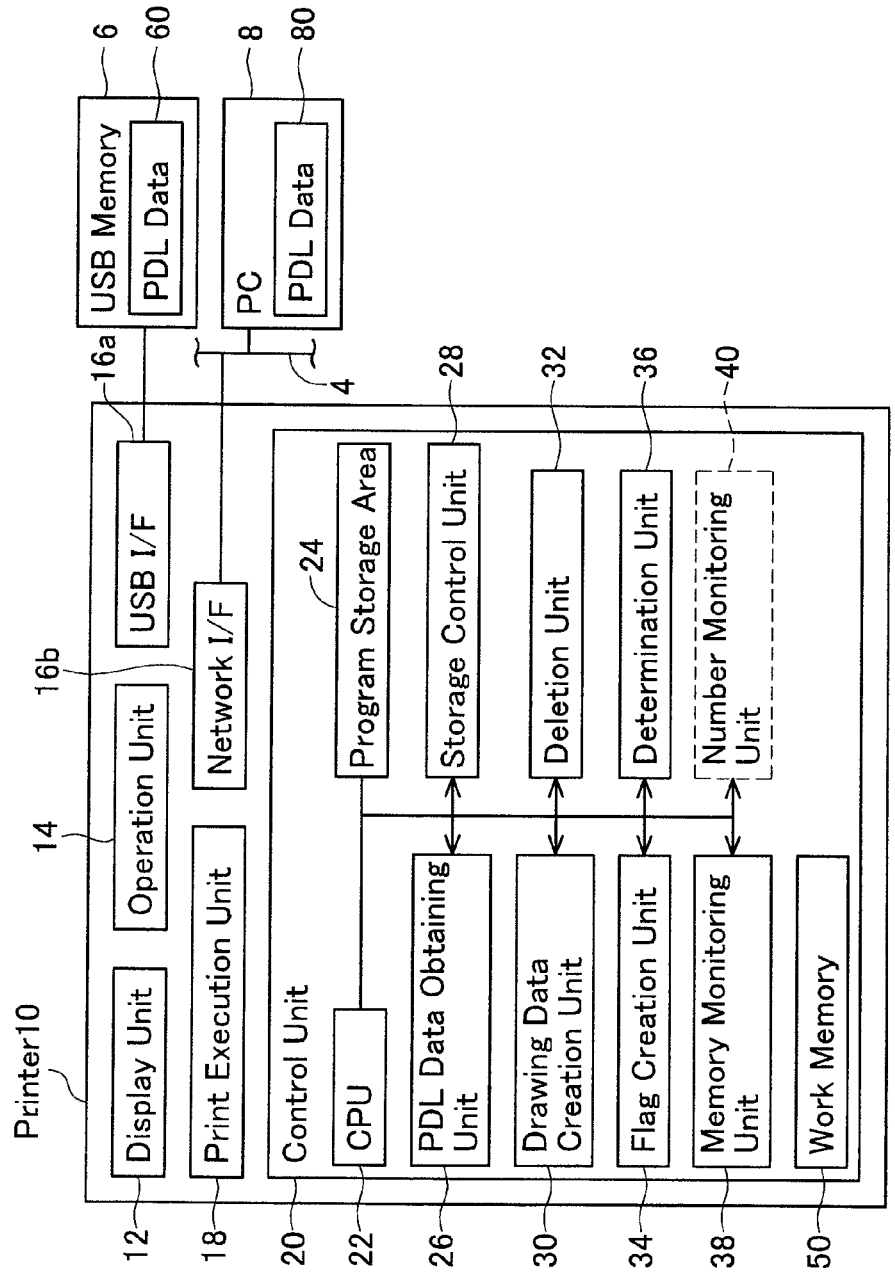
FIG. 1 shows an example of a configuration of a data processing system.

(Configuration of the Printer 10)
The printer 10 comprises a display unit 12, operation unit 14, USB interface 16a, print execution unit 18, network interface 16b, and control unit 20. The display unit 12 displays various types of information. The operation unit 14 comprises a plurality of keys. A user can input various commands to the printer 10 by operating the operation unit 14. The print execution unit 18 comprises an ink jet type or laser type print mechanism. The print execution unit 18 prints an image on a print medium in accordance with drawing data supplied from the control unit 20.

The portable USB memory (that is, external memory) 6 is connected to the USB interface 16a. The USB memory 6 stores PDL data 60. The PDL data 60 of the present embodiment is XPS data. For example, the user creates the PDL data 60 utilizing a predetermined device (e.g., the PC 8), connects the USB memory 6 to the predetermined device, and stores the PDL data 60 in the USB memory 6. Next, the user connects the USB memory 6 to the USB interface 16a. The USB memory 6 is connected directly to the USB interface 16a without passing through a communication cable such as the LAN 4, etc. The printer 10 obtains the PDL data 60 from the USB memory 6 through the USB interface 16a.

The LAN 4 is connected to the network interface 16b. The PC 8 is connected to the LAN 4. The PC 8 has an application (e.g., a printer driver of the printer 10; not shown) for creating PDL data 80. The PDL data 80 of the present embodiment is XPS data. The PC 8 changes data (e.g., document data), whose printing has been instructed by the user, into the PDL data 80 utilizing the aforementioned application. The PC 8 sends the PDL data 80 to the printer 10. The printer 10 thereby obtains the PDL data 80 through the network interface 16b.

The control unit 20 comprises a CPU 22 and a program storage area 24. The CPU 22 executes various processes in accordance with programs stored in the program storage area 24. A PDL data obtaining unit 26, storage control unit 28, drawing data creation unit 30, deletion unit 32, flag creation unit 34, determination unit 36, and memory monitoring unit 38 are realized by the CPU 22 and the programs stored in the program storage area 24. Although a number monitoring unit 40 is also shown in FIG. 1, this is utilized in a second embodiment (to be described). The control unit 20 further comprises a work memory 50.

(Configuration of the PDL Data 80)

Figure 2:
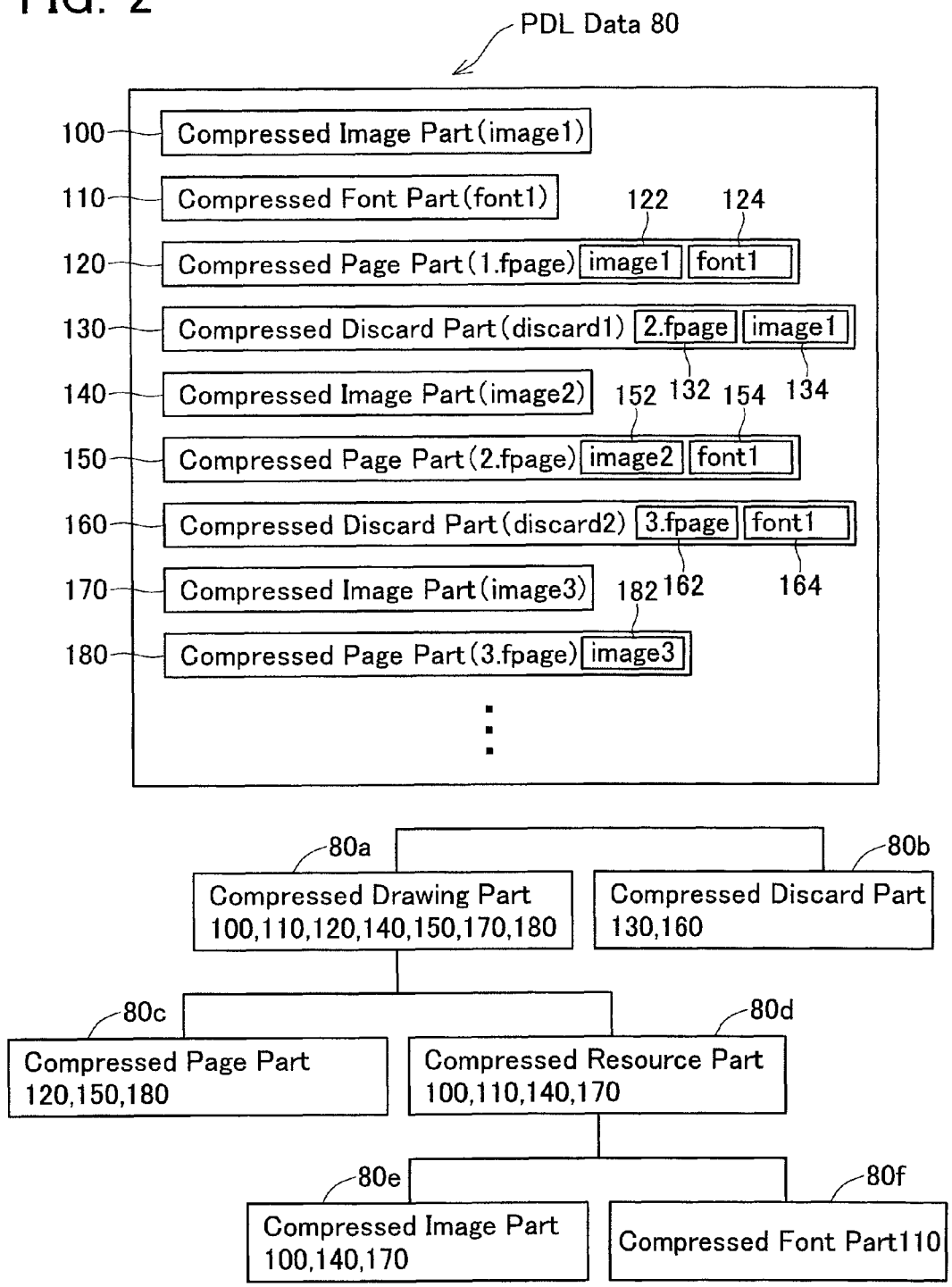
FIG. 2 shows an example of PDL data.

An upper figure of FIG. 2 shows an example of the PDL data 80 (XPS data) created by the PC 8. A lower figure of FIG. 2 shows an example of classifications of parts included in the PDL data 80. The PDL data 80 includes a plurality of compressed parts 100 to 180. The character strings inside parentheses (e.g., "image1") of the parts 100 to 180 indicate file names associated with the parts 100 to 180 (simplified below to "file name of parts"). The file name includes an extension which is not shown in FIG. 2.

As shown in the lower figure of FIG. 2, the XPS format PDL data is classified into a compressed drawing part 80a and a compressed discard part (DiscardControl) 80b. In the case of the PDL data 80, the compressed discard part 80b includes compressed discard parts 130, 160. As shown in the upper figure of FIG. 2, each of the compressed discard parts 130, 160 includes timing information 132, 162 and data information 134, 164. Each of the timing information 132, 162 includes page information (e.g., "Sentinelpage=2.fpage" etc.). Further, each of the data information 134, 164 includes a file name (e.g., "image1" "font1" etc.). Each of the data information 134, 164 indicates a compressed drawing part (e.g., a compressed image part 100 having the file name "image1") which is a deletion target capable of being deleted subsequent to a completion for the creation of drawing data (e.g., the drawing data of a first page) of one page preceding a page (e.g., a second page) corresponding to page information (e.g., "2.fpage") included in the timing information 132, 162 and prior to a start for the creation of drawing data (e.g., the drawing data of the second page) of the page (e.g., a second page) corresponding to the page information (e.g., "2.fpage").

The compressed drawing parts 80a include all types of parts other than the compressed discard parts 80b. In the case of the PDL data 80, the compressed drawing parts 80a include compressed parts 100, 110, 120, 140, 150, 170, 180. The compressed drawing parts 80a are utilized for creating drawing data.

The compressed drawing parts 80a are further classified into compressed page parts (FixedPage) 80c and compressed resource parts 80d. Actually, the compressed drawing parts 80a can be further classified into other types of parts (e.g., FixedDocument). However, in the present embodiment, an explanation of other types of parts is omitted. In the case of the PDL data 80, the compressed page parts 80c include compressed page parts 120, 150, 180. The file names (e.g., "1.fpage") of the compressed page parts 120, etc. indicate page information of the drawing data which is to be created utilizing that compressed page part. For example, the file name of the compressed page part 120 is "1.fpage". This indicates that the drawing data of the first page is created utilizing the compressed page part 120. Each of the compressed page parts 120, 150, 180 includes designation information 122, 124, 152, 154, 182 designating the file name of the compressed resource parts. For example, the compressed page part 120 of the first page includes the designation information 122 that designates the file name "image1" of the compressed image part 100. This indicates that the drawing data of the first page is created utilizing the compressed image part 100 (actually a decompressed image part 108 (FIG. 3) created from the compressed image part 100). Moreover, the compressed page part 120 of the first page includes information (not shown) designating the location where an image corresponding to the compressed image part 100 is to be printed. Further, the compressed page part 120 of the first page further includes the designation information 124 designating the file name "font1" of the compressed font part 110. This indicates that the thawing data of the first page is created utilizing the compressed font part 110 (actually a decompressed font part 118 (FIG. 3) created from the compressed font part 110). Moreover, the compressed page part 120 of the first page includes information (not shown) designating text described in accordance with the font corresponding to the compressed font part 110, and a location where that text is to be printed.

The compressed resource parts 80d are further classified into compressed image parts 80e and a compressed font part 80f. Actually, the compressed resource parts 80d can be further classified into other types of parts (e.g., ICCProfile). However, in the present embodiment, an explanation of the other types of parts is omitted. In the case of the PDL data 80, the compressed image parts 80e include the compressed image parts 100, 140, 170. Further, in the case of the PDL data 80, the compressed font part 80f includes the compressed font part 110.

(Outline of Process for Creating Drawing Data)

Next, an outline of process for creating the drawing data utilizing the aforementioned PDL data 80 will be explained with reference to FIGS. 3 to 06. Utilizing the PC 8, the user can execute an operation (e.g., specifying document data that is a printing target) for causing the printer 10 to print. The PC 8 thereby creates the PDL data 80. Next, the PC 8 sends a printing instruction to the printer 10. Next, the PC 8 sequentially sends, to the printer 10, a plurality of compressed parts 100, etc. included in the PDL data 80 in accordance with a predetermined sequence. In the present embodiment, the PC 8 sends the compressed parts 100, etc. to the printer 10 in the sequence from top to bottom of FIG. 2. That is, first the compressed image part 100, then the compressed font part 110, and then the compressed page part 120 are sent.

Figure 3:
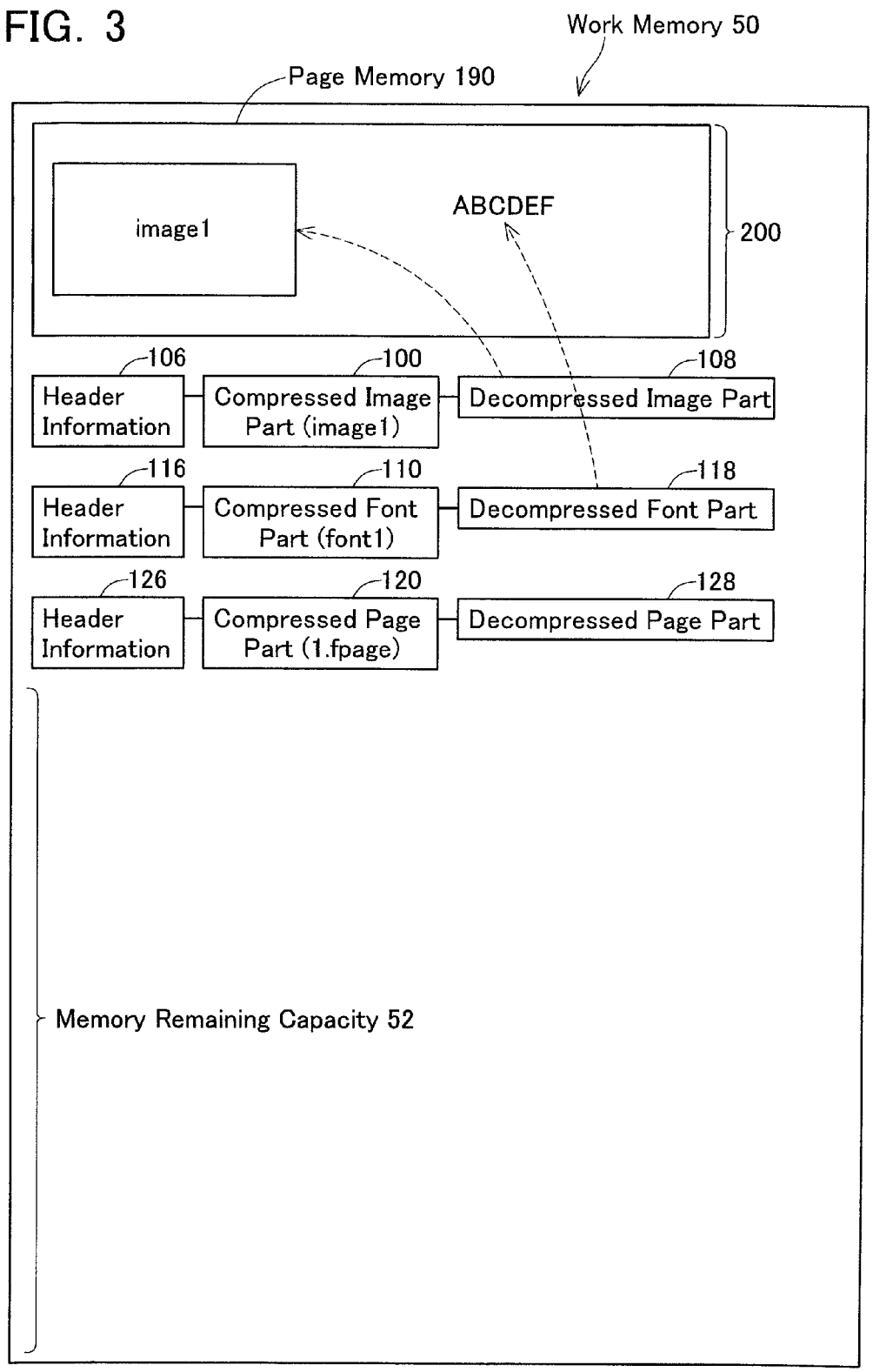
FIG. 3 shows how drawing data of a first page is created.

Upon receiving the printing instruction sent from the PC 8, the control unit 20 executes the following processes. As shown in FIG. 3, the control unit 20 secures a page memory 190 in the work memory 50. The page memory 190 has a capacity for storing one page of drawing data. The compressed parts 100, etc. sent sequentially from the PC 8 are stored sequentially in a receive buffer (not shown) provided in the network interface 16b. The control unit 20 sequentially stores, in the work memory 50, the compressed parts 100, etc. stored sequentially in the receive buffer. The control unit 20 first stores the compressed image part 100 in the work memory 50. At this juncture, the control unit 20 decompresses a header part (not shown) of the compressed image part 100. The control unit 20 thereby obtains image information indicating the presence of an image, information relating to the size of the compressed image part 100, information relating to the size of the data obtained by decompressing all the compressed image part 100 (i.e., the size of the decompressed image part 108: to be described), and information relating to compressed format. The control unit 20 creates header information 106 that includes the above obtained various information, the file name "image1" of the compressed image part 100, and an address of the compressed image part 100 in the work memory 50. The control unit 20 stores the header information 106 in the work memory 50. As described above, since the header information 106 includes the address of the compressed image part 100, it can be said that the header information 106 and the compressed image part 100 are associated.

Next, similar to the case of the compressed image part 100, the control unit 20 stores the compressed font part 110. At this juncture, the control unit 20 stores header information 116 in association with the compressed font part 110. The header information 116 has the same configuration as the header information 106. However, the header information 106 includes image information indicating the presence of an image, whereas the header information 116 instead includes font information indicating the presence of a font. Next, the control unit 20 stores the compressed page part 120 of the first page. At this juncture, the control unit 20 stores an association of header information 126 and the compressed page part 120 of the first page.

In a case where the compressed page part 120 of the first page has been obtained, the control unit 20 creates a decompressed page part 128 in the work memory 50 by decompressing the compressed page part 120 of the first page. Further, the control unit 20 writes an address of the decompressed page part 128, which is in the work memory 50, into the header information 126 associated with the compressed page part 120 of the first page. Moreover, when decompressed parts have been created by decompressing other compressed parts, as well, the control unit 20 writes addresses of the decompressed parts into the header information. A description of this writing process is omitted below.

Next, the control unit 20 reads the designation information 122, 124 (FIG. 2) from the decompressed page part 128. The control unit 20 creates the decompressed image part 108 in the work memory 50 by decompressing the compressed image part 100 designated by the designation information 122 (image1). Further, the control unit 20 creates the decompressed font part 118 in the work memory 50 by decompressing the compressed font part 110 designated by the designation information (font1) 124. Next, the control unit 20 writes an image corresponding to the decompressed image part 108 in a location in the page memory 190 corresponding to a location designated in the decompressed page part 128. Further, the control unit 20 creates a text ("ABCDEF" of FIG. 3) described in accordance with the decompressed font part 118, this being the text designated in the decompressed page part 128. Next, the control unit 20 writes the aforementioned text in a location in the page memory 190 corresponding to a location designated in the decompressed page part 128. Drawing data 200 of the first page is thereby completed.

Next, the control unit 20 supplies the drawing data 200 of the first page to the print execution unit 18 (FIG. 1). Consequently, the print execution unit 18 prints on one piece of print medium in accordance with the drawing data 200 of the first page. After having supplied the drawing data 200 of the first page to the print execution unit 18, the control unit 20 clears (deletes) the drawing data 200 written in the page memory 190. As a result, the page memory 190 is released. When the drawing data of the second and subsequent pages are completed, as well, the control unit 20 supplies the drawing data to the print execution unit 18. A description of this supply process is omitted below.

Figure 4:
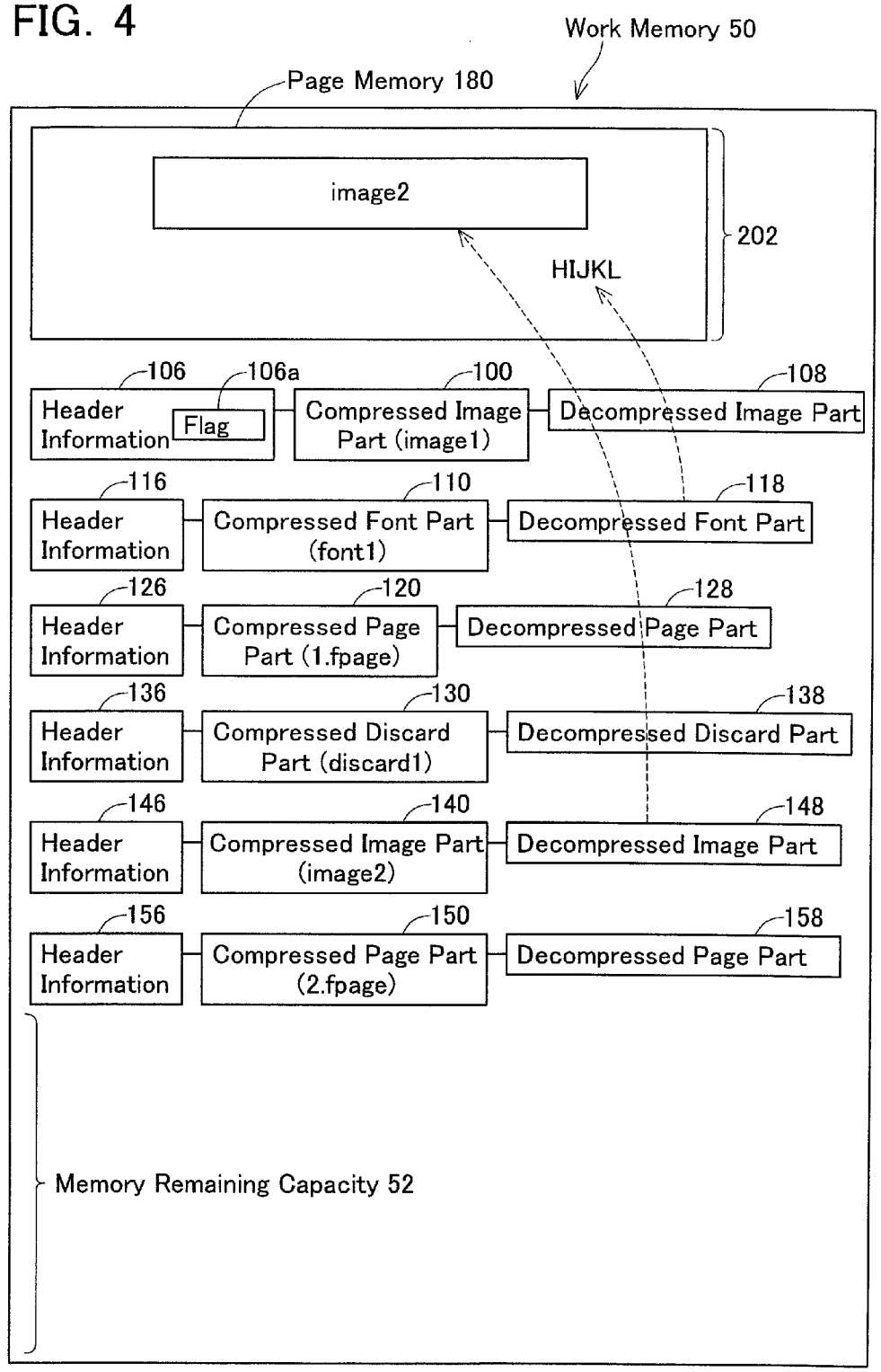
FIG. 4 shows how drawing data of a second page is created.

Next, as shown in FIG. 4, the control unit 20 stores the compressed discard part 130. At this juncture, the control unit 20 stores header information 136 in association with the compressed discard part 130. Next, the control unit 20 stores a compressed image part 140 and header information 146, and stores a compressed page part 150 of the second page and header information 156.

In a case where the compressed page part 150 of the second page has been obtained, the control unit 20 creates a decompressed discard part 138 in the work memory 50 by decompressing the compressed discard part 130. Next, the control unit 20 reads timing information 132 and data information 134 (FIG. 2) from the decompressed discard part 138. As shown in FIG. 2, the timing information 132 indicates "2.fpage," and the data information 134 indicates "image1" This indicates that the compressed image part 100 of the file name "image1" can be deleted after creation of the drawing data 200 of the first page (FIG. 3) has been completed and before creation of the drawing data of the second page is started. The control unit 20 writes a flag 106a in the header information 106 associated with the compressed image part 100 indicated by the data information 134.

Next, the control unit 20 creates a decompressed page part 158 in the work memory 50 by decompressing the compressed page part 150 of the second page. Next, the control unit 20 reads the designation information 152, 154 (FIG. 2) from the decompressed page part 158. The control unit 20 creates a decompressed image part 148 in the work memory 50 by decompressing the compressed image part 140 designated by the designation information 152 (image2). Here, the control unit 20 does not decompress the compressed font part 110 (font1) designated by the designation information 154. This is because the compressed font part 110 has already been decompressed when the drawing data 200 of the first page was created. Next, the control unit 20 writes an image corresponding to the decompressed image part 148 to a location in the page memory 190 corresponding to a location designated in the decompressed page part 158. Further, the control unit 20 creates text ("HIJKL" of FIG. 4) described in accordance with the decompressed font part 118, this being the text designated in the decompressed page part 158. Next, the control unit 20 writes the aforementioned text in a location in the page memory 190 corresponding to a location designated in the decompressed page part 158. Drawing data 202 of the second page is thereby completed. Larger number of parts is stored in the work memory 50 at the step of completing the drawing data 202 of the second page compared to the step of completing the drawing data 200 of the first page. Consequently, remaining capacity 52 of the work memory 50 shown in FIG. 4 is smaller than the remaining capacity 52 of the work memory 50 shown in FIG. 3.

Figure 5:
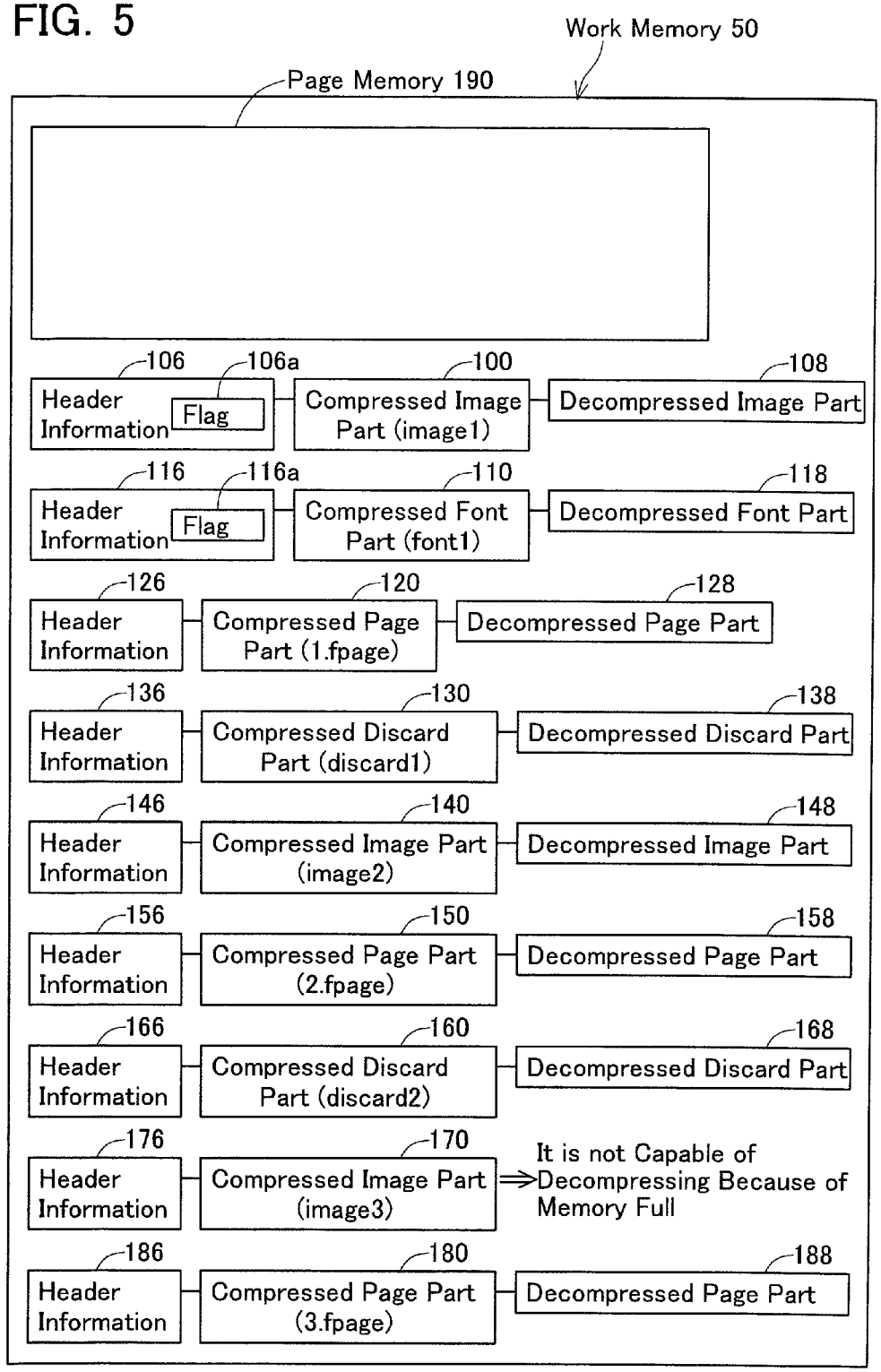
FIG. 5 shows how memory full occurs.

Next, as shown in FIG. 5, the control unit 20 stores a compressed discard part 160 and header information 166, a compressed image part 170 and header information 176, and a compressed page part 180 of the third page and header information 186.

In a case where the compressed page part 180 of the third page has been obtained, the control unit 20 creates a decompressed discard part 168 in the work memory 50 by decompressing the compressed discard part 160. Next, the control unit 20 reads the timing information 132, 162 and the data information 134, 164 (FIG. 2) from the decompressed discard parts 138, 168. As shown in FIG. 2, the timing information 162 indicates "3.fpage," and the data information 164 indicates "font1." This indicates that the compressed font part 110 of the file name "font1" can be deleted after creation of the drawing data 202 of the second page (FIG. 4) has been completed and before creation of the drawing data of the third page is started. The control unit 20 writes a flag 116a in the header information 116 associated with the compressed font part 110 indicated by the data information 164.

Next, the control unit 20 creates a decompressed page part 188 in the work memory 50 by decompressing the compressed page part 180 of the third page. Next, the control unit 20 reads the designation information 182 (FIG. 2) from the decompressed page part 188. The control unit 20 attempts to decompress the compressed image part 170 designated by the designation information 182 (image3). In the example of FIG. 5, when the compressed image part 170 is to be decompressed during the process of creating the drawing data of the third page, the remaining capacity of the work memory 50 becomes smaller than a predetermined capacity (one byte in the present embodiment), and reaches a state of being unable to decompress the compressed image part 170 (a memory full state). In this case, the control unit 20 specifies the header information 106, 116 which include the flags 106a, 116a, by reading the header information 106, etc. in the work memory 50. As described above, the header information 106 includes the image information that indicates the presence of an image, and the header information 116 includes font information that indicates the presence of a font. The control unit 20 selects, on a priority basis, the header information 116 which includes the font information from among the specified plural sets of header information 106, 116. Next, the control unit 20 specifies the address of the compressed font part 110 and the address of the decompressed font part 118 included in the selected header information 116. The control unit 20 deletes the compressed font part 110 in accordance with the address of the compressed font part 110, and deletes the decompressed font part 118 in accordance with the address of the decompressed font part 118. Further, the control unit 20 also deletes the header information 116. The work memory 50 is released by these deletion processes. In the present embodiment, since the remaining capacity 52 is increased by means of these deletion processes, the compressed image part 170 can be decompressed in the work memory 50.

Figure 6:
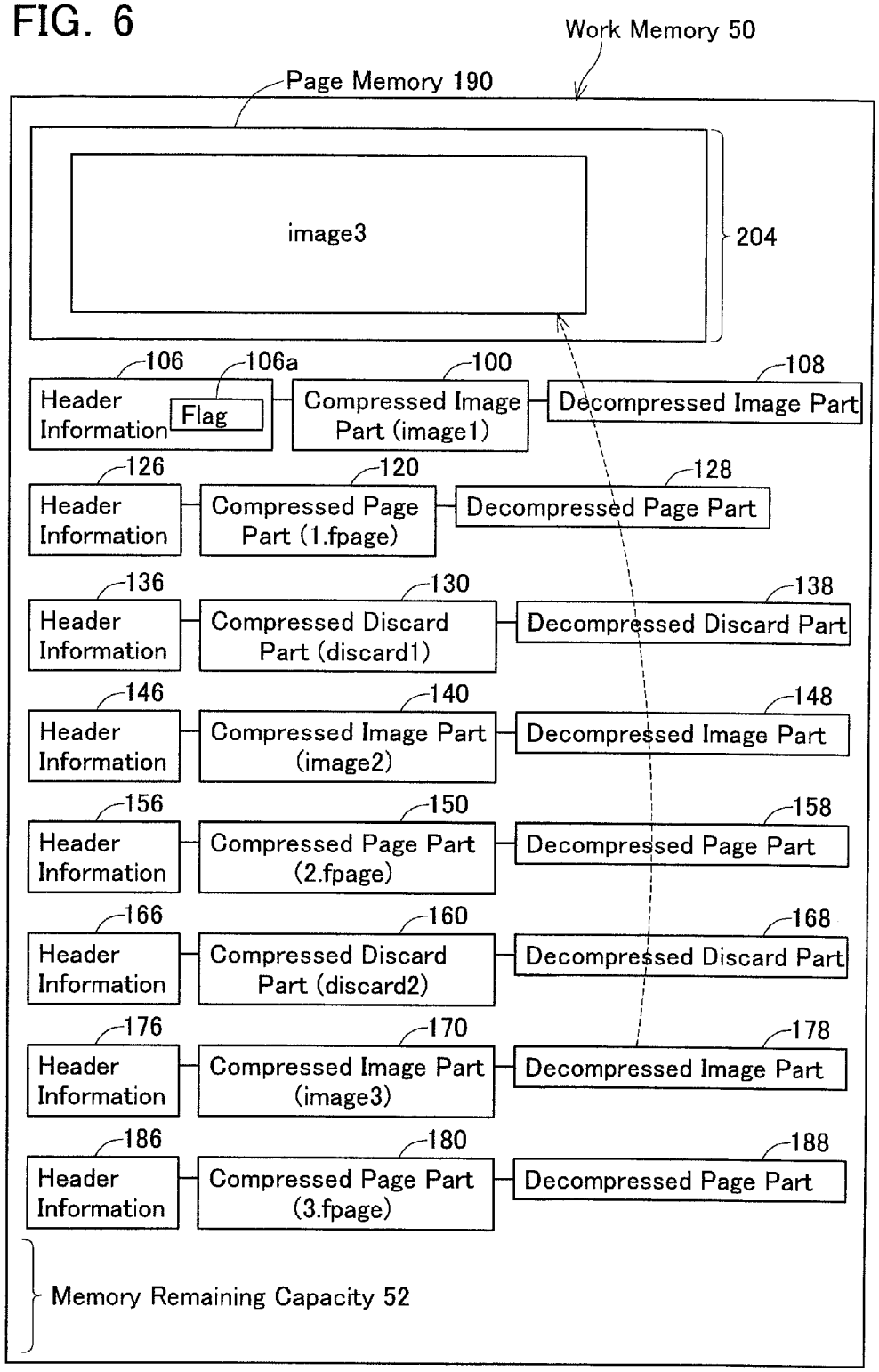
FIG. 6 shows how drawing data of a third page is created.

As shown in FIG. 6, the control unit 20 creates a decompressed image part 178 in the work memory 50 by decompressing the compressed image part 170. Next, the control unit 20 writes an image corresponding to the decompressed image part 178 in a location in the page memory 190 corresponding to a location designated in the decompressed page part 188. Drawing data 204 of the third page is thereby completed.

(Drop Print Process)

Figure 7:
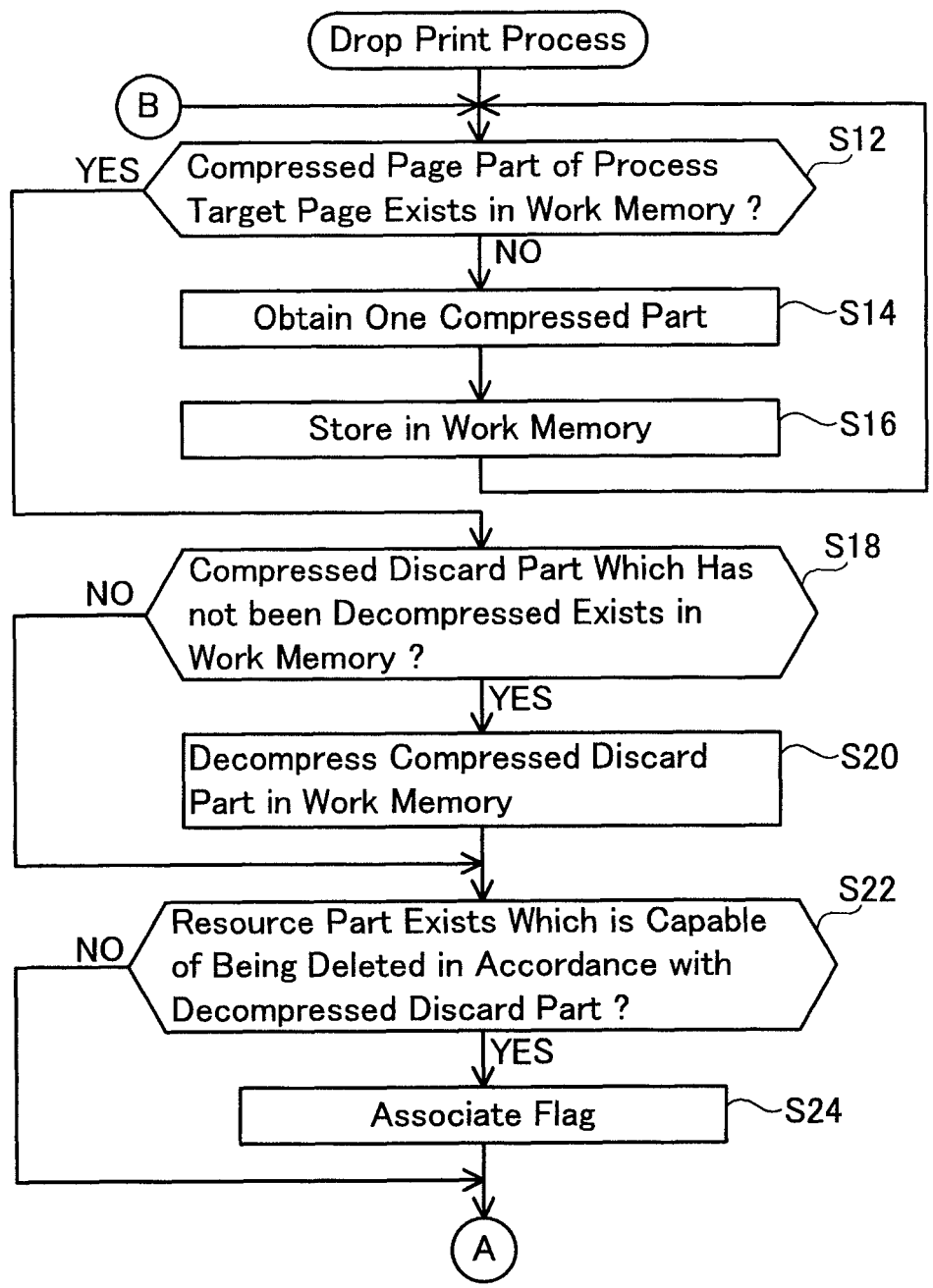
FIG. 7 shows a flowchart of a drop print process.
Figure 8:
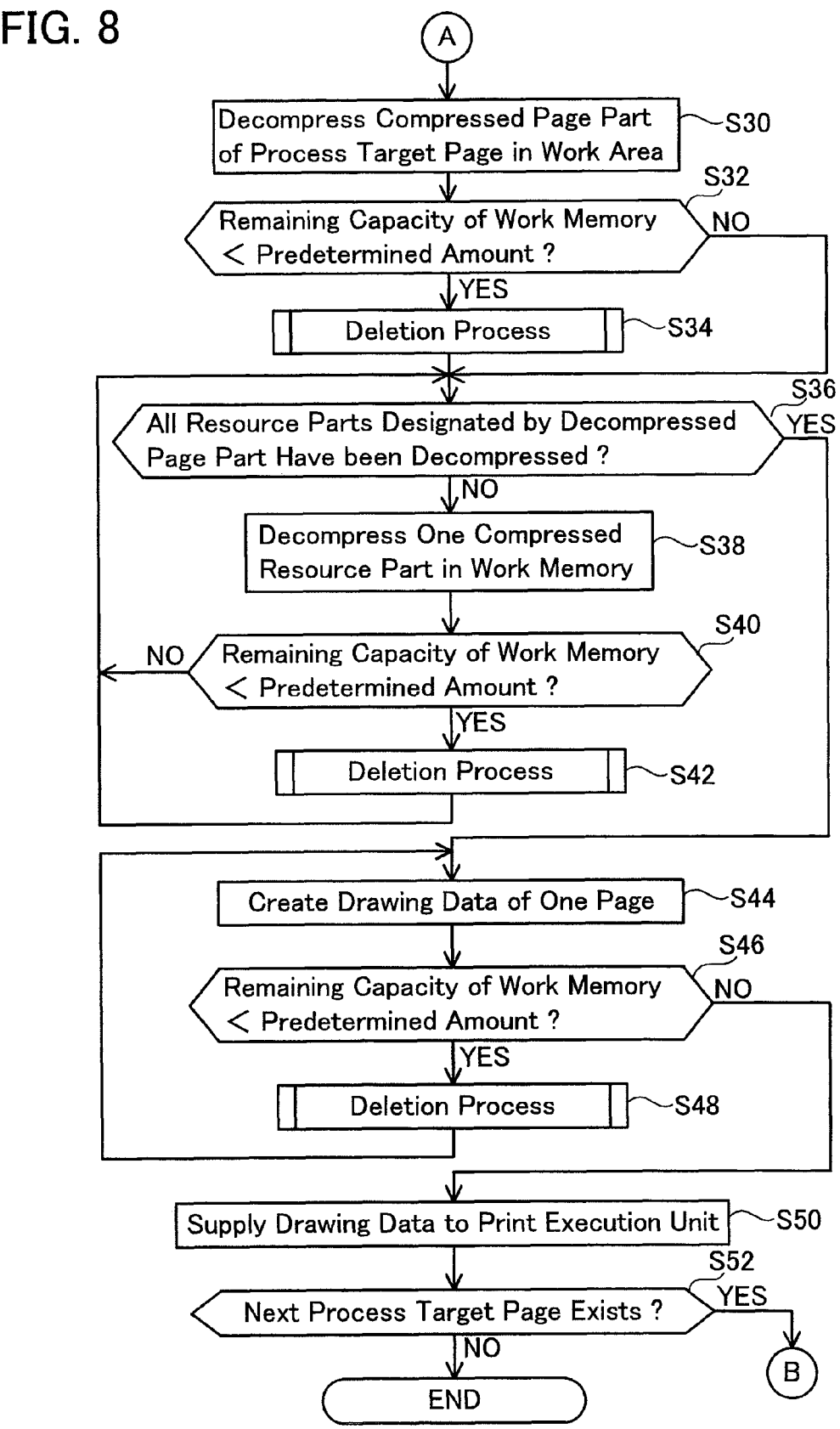
FIG. 8 shows a continuation of the flowchart of FIG. 7.

Next, the contents of a process executed by the control unit 20 will be explained in detail. FIGS. 7 and 8 show a flowchart of a drop print process executed by the control unit 20. The control unit 20 executes the drop print process upon receiving a printing instruction through the network interface 16b. Moreover, the processes explained utilizing FIGS. 3 to 6 correspond to the drop print process.

The control unit 20 determines whether there exists in the work memory 50 a compressed page part (called "process target compressed page part" below) that has page information corresponding to a process target page (currently a first page) as its file name (S12). In the case of NO, the PDL data obtaining unit 26 (FIG. 1) obtains one compressed part (e.g., the compressed image part 100 of FIG. 3) from the receive buffer (not shown) provided in the network interface 16b (S14). Next, the storage control unit 28 (FIG. 1) stores the compressed part obtained in S14 in the work memory 50 (S16). In S16, the storage control unit 28 further stores header information (e.g., the header information 106 of FIG. 3) in the work memory 50. Upon ending S16, the control unit 20 returns to S12. The processes S14 and S16 are repeated until the process target compressed page part (e.g., the compressed page part 120 of FIG. 3) is obtained.

In the case of YES in S12, the control unit 20 determines whether a compressed discard part which has not been decompressed (e.g., the compressed discard part 130 of FIG. 4) exists in the work memory 50 (S18). In a case of YES, the control unit 20 creates a decompressed discard part (e.g., the decompressed discard part 138 of FIG. 4) in the work memory 50 by decompressing the compressed discard part which has not been decompressed (S20). In S20, the control unit 20 further writes an address of the decompressed discard part into header information (e.g., the header information 136 of FIG. 3). Upon ending S20, or in a case of NO in S18, the control unit 20 proceeds to S22.

In S22, the flag creation unit 34 (FIG. 1) reads all the decompressed discard parts (e.g., the decompressed discard part 138 of FIG. 4) which exist in the work memory 50. The flag creation unit 34 determines whether a decompressed discard part (called "specific decompressed discard part" below) which includes page information corresponding to the current process target page exists among all the decompressed discard parts that have been read. For example, if the current process target page is "2," and the page information included in the decompressed discard part 138 (FIG. 4) is "2.fpage", the flag creation unit 34 determines YES in S22. In the case of YES in S22, the flag creation unit 34 specifies the file name of the compressed resource part indicated by the data information included in the specific decompressed discard part (e.g., "image1" indicated by the data information 134 of FIG. 2). Next, the flag creation unit 34 writes a flag (e.g., the flag 106a of FIG. 4) into header information (e.g., the header information 106 of FIG. 4) including the specified file name (S24). Upon ending S24, or in a case of NO in S22, the control unit 20 proceeds to S30 of FIG. 8. The creation of drawing data of the current process target page is started by starting the process S30.

In S30, the drawing data creation unit 30 (FIG. 1) creates a decompressed page part (e.g., the decompressed page part 128 of FIG. 3) in the work memory 50 by decompressing a compressed page part (e.g., the compressed page part 120 of FIG. 3) which has page information corresponding to the current process target page as its file name. The memory monitoring unit 38 (FIG. 1) monitors whether the remaining capacity of the work memory 50 becomes less than the predetermined capacity during execution of the decompression process S30 (S32). In the present embodiment, since the predetermined capacity is one byte, the memory monitoring unit 38 monitors whether the remaining capacity of the work memory 50 becomes zero. In a case of YES in S32, the control unit 20 executes the deletion process (S34). The contents of the deletion process will be explained in detail later. If the deletion process of S34 has ended normally, or in a case of NO in S32, the control unit 20 proceeds to S36.

In S36, the drawing data creation unit 30 reads the decompressed page part created in S30 (e.g., the decompressed page part 128 of FIG. 3). The drawing data creation unit 30 can thereby obtain the file name included in the decompressed page part (e.g., "image1" of the designation information 122 and "font1" of the designation information 124 of FIG. 2). The drawing data creation unit 30 determines whether a compressed resource part having the obtained file name has already been decompressed. This determination is executed as described below. The drawing data creation unit 30 specifies header information (e.g., the header information 106 of FIG. 3) associated with the compressed resource part that has the obtained file name. The drawing data creation unit 30 determines whether an address of the decompressed resource part has been written in the specified header information. If the address of the decompressed resource part has been written in the specified header information, YES is determined in S36. If plural file names have been obtained from the decompressed page part created in S30, the drawing data creation unit 30 determines in S36 whether the plural compressed resource parts having the plural file names have all been decompressed already. If even one compressed resource part which has not been decompressed is present, NO is determined in S36.

A situation may also occur in which the compressed resource part of the file name included in the decompressed page part created in S30 has not yet been obtained. Although not shown in the flowchart, in this type of situation, the PDL data obtaining unit 26 executes the processes S14 and S16 of FIG. 7 until the unobtained compressed resource part is obtained.

In the case of NO in S36, the drawing data creation unit 30 creates a decompressed resource part (e.g., the decompressed image part 108 of FIG. 3) in the work memory 50 by decompressing one compressed resource part which has not been decompressed and which has the file name obtained from the decompressed page part created in S30 (S38). During execution of the decompression process of S38, the memory monitoring unit 38 monitors whether the remaining capacity of the work memory 50 becomes less than the predetermined capacity (S40). In a case of YES in S40, the control unit 20 executes the deletion process (S42). If the deletion process of S42 has ended normally, or in a case of NO in S40, the control unit 20 returns to S36.

In the case of YES in S36, the drawing data creation unit 30 attempts to create one page of drawing data (e.g., the drawing data 200 of the first page of FIG. 3) corresponding to the current process target page in accordance with the decompressed page part created in S30 (S44). Details of the process S44 have already been explained with reference to FIGS. 3 to 6. In the process S44, the thawing data creation unit 30 executes processes (a gradation process, graphic process, image rotation process, etc) for creating one page of drawing data corresponding to the current process target page. The work memory 50 is utilized when these processes are executed. While executing the process S44, the memory monitoring unit 38 monitors whether the remaining capacity of the work memory 50 becomes less than the predetermined capacity (S46). In a case of YES in S46, the control unit 20 executes the deletion process (S48). In the present embodiment, as is clear from executing the deletion process S48, the deletion process can also be executed during the process of creating drawing data (the processes S30 to S50 of FIG. 8). If the deletion process S48 has ended normally, the control unit 20 returns to S44. If the one page of drawing data corresponding to the current process target page has been completed, NO is determined in S46 regardless of the remaining capacity of the memory. In this case, the control unit 20 supplies the one page of drawing data created in S44 to the print execution unit 18 (S50). After supplying the one page of drawing data to the print execution unit 18, the control unit 20 clears (deletes) the drawing data written in the page memory 190.

The control unit 20 determines whether a next process target page exists (S52). Although not shown, the PDL data 80 (FIG. 2) includes text information indicating all the page information to be printed. The control unit executes the determination S52 utilizing this text information. In a case of NO in S52, the drop print process ends. In a case of YES in S52, the control unit 20 returns to S12 of FIG. 7.

(Deletion Process)

Figure 9:
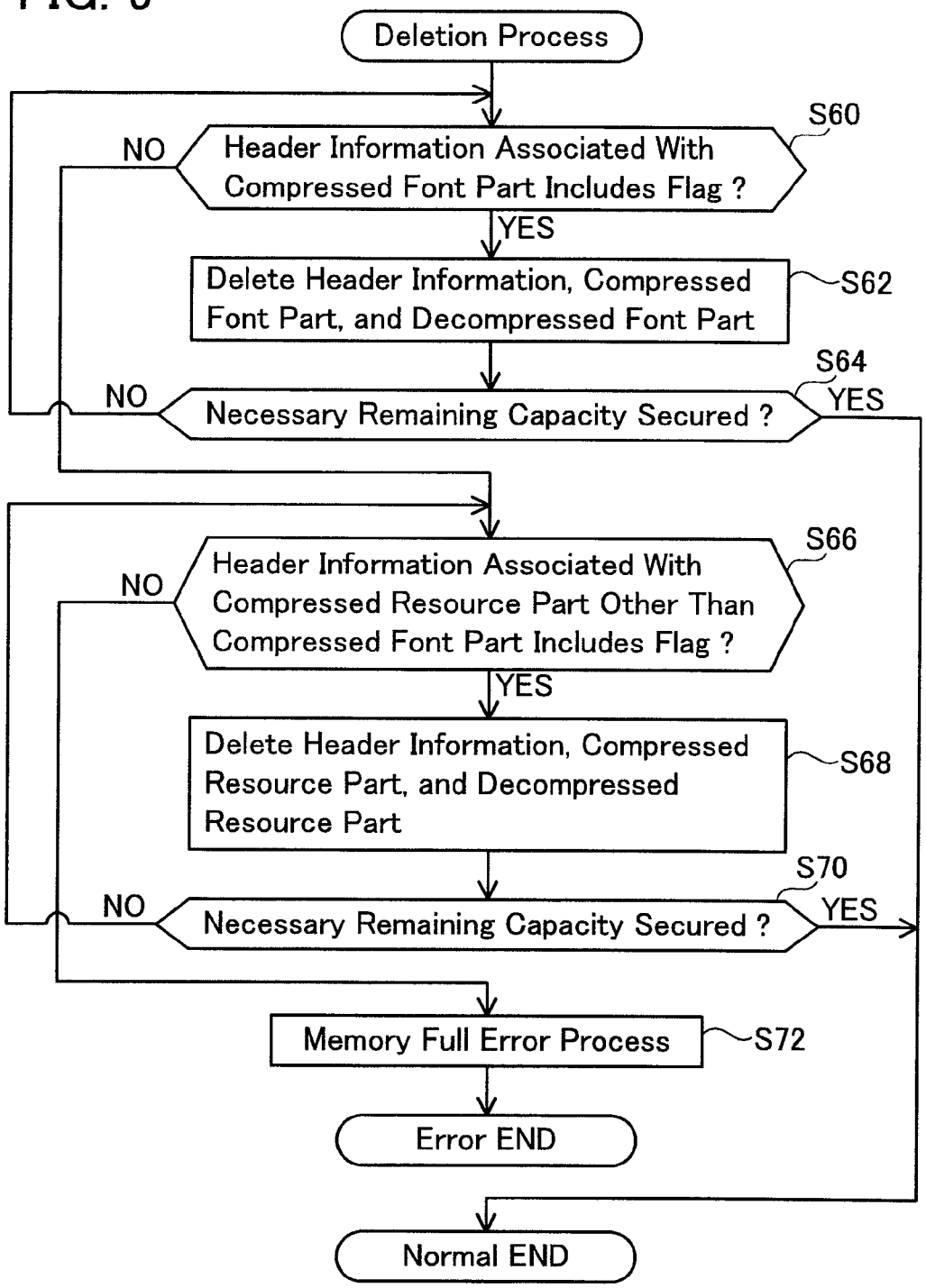
FIG. 9 shows a flowchart of a deletion process.

Next, the contents of the deletion process executed in S34, S42, and S48 of FIG. 8 will be explained in detail. FIG. 9 shows a flowchart of the deletion process. The deletion unit 32 (FIG. 1) reads the header information (e.g., the header information 106, 116, etc. of FIG. 5) existing in the work memory 50. Next, the deletion unit 32 determines whether header information (called "specific font header information" below) that includes a flag and font information indicating the presence of a font is present (S60). In a case of YES, the deletion unit 32 deletes, from the work memory 50, the specific font header information, the compressed font part associated with the specific font header information, and the decompressed font part created from the compressed font part (S62). One set of header information, one compressed font part, and one decompressed font part are thereby deleted. Next, in the deletion process S34 or S42 of FIG. 8, the determination unit 36 (FIG. 1) determines whether remaining capacity necessary to decompress the compressed parts which have not been decompressed in S30 or S38 of FIG. 8 has been secured in the work memory 50 (S64). On the other hand, in the deletion process S48 of FIG. 8, the determination unit 36 (FIG. 1) determines whether remaining capacity necessary to create the drawing data in S44 of FIG. 8 has been secured in the work memory 50 (S64).

The process S64 executed in the deletion processes S34 and S42 of FIG. 8 will be explained in detail. When YES has been determined in S32 or S40 of FIG. 8, a portion of the compressed part which had not been decompressed is decompressed. Consequently, the determination unit 36 can specify a size of the decompressed data (called "decompressed data size" below). Next, the determination unit 36 specifies, from the header information associated with the compressed part which has not been decompressed, a size of the data (called "total data size" below) created in the case of decompressing all the compressed part which has not yet been decompressed. By subtracting the decompressed data size from the total data size, the determination unit 36 specifies a size of the data (called "data size which has not been decompressed" below) created in the case of decompressing the remaining portion of the compressed part which has not been decompressed. The determination unit 36 determines whether the remaining capacity of the work memory 50 is greater than the data size which has not been decompressed. If the remaining capacity is greater than the data size which has not been decompressed, YES is determined in S64. In the case of YES in S64, the control unit 20 proceeds to S36 of FIG. 8. In this case, since the compressed part which has not been decompressed (compressed part of which only a portion has been decompressed) is present, NO is determined in S36, and decompression is executed of the remaining portion of the compressed part which has not been decompressed (S38).

Next, the process S64 executed in the deletion process S48 of FIG. 8 will be explained in detail. If YES had been determined in S46 of FIG. 8, a part of the drawing data of the current process target page has been created. The determination unit 36 specifies the memory capacity needed to create the remaining drawing data (the memory capacity needed to execute the remaining gradation processes, etc.). The determination unit 36 determines whether the remaining capacity of the work memory 50 is greater than the necessary memory capacity. If the remaining capacity is greater than the necessary memory capacity, YES is determined in S64. In the case of YES in S64, the creation of drawing data in S44 of FIG. 8 is resumed.

In a case of NO in S64, the control unit 20 returns to S60. In a case of NO in S60, the deletion unit 32 determines whether header information that includes the flag is present (S66). That is, the deletion unit 32 determines whether header information is present which includes the flag and which is header information associated with a compressed resource part (e.g., compressed image part) other than the compressed font part. In a case of YES, as in the case of S62, the deletion unit 32 deletes the header information, compressed resource part, and decompressed resource part from the work memory 50 (S68). One set of header information, one compressed resource part, and one decompressed resource part are thereby deleted. The determination process of S70 which is executed subsequently is the same as the determination process of S64. In a case of YES in S70, the control unit 20 proceeds to S36 or S44 of FIG. 8.

In a case of NO in S70, the control unit 20 returns to S66. In a case of NO in S66, the control unit 20 executes a memory full error process (S72). For example, the control unit 20 displays, in the display unit 12 (FIG. 1), information indicating that printing cannot be performed. Further, the control unit 20 may supply, to the print execution unit 18, e.g., print data indicating that printing cannot be performed. If S72 is executed, the control unit 20 does not proceed to S36 or S44 of FIG. 8 even if the deletion process of FIG. 9 has ended.

(Direct Print Process)

Figure 10:
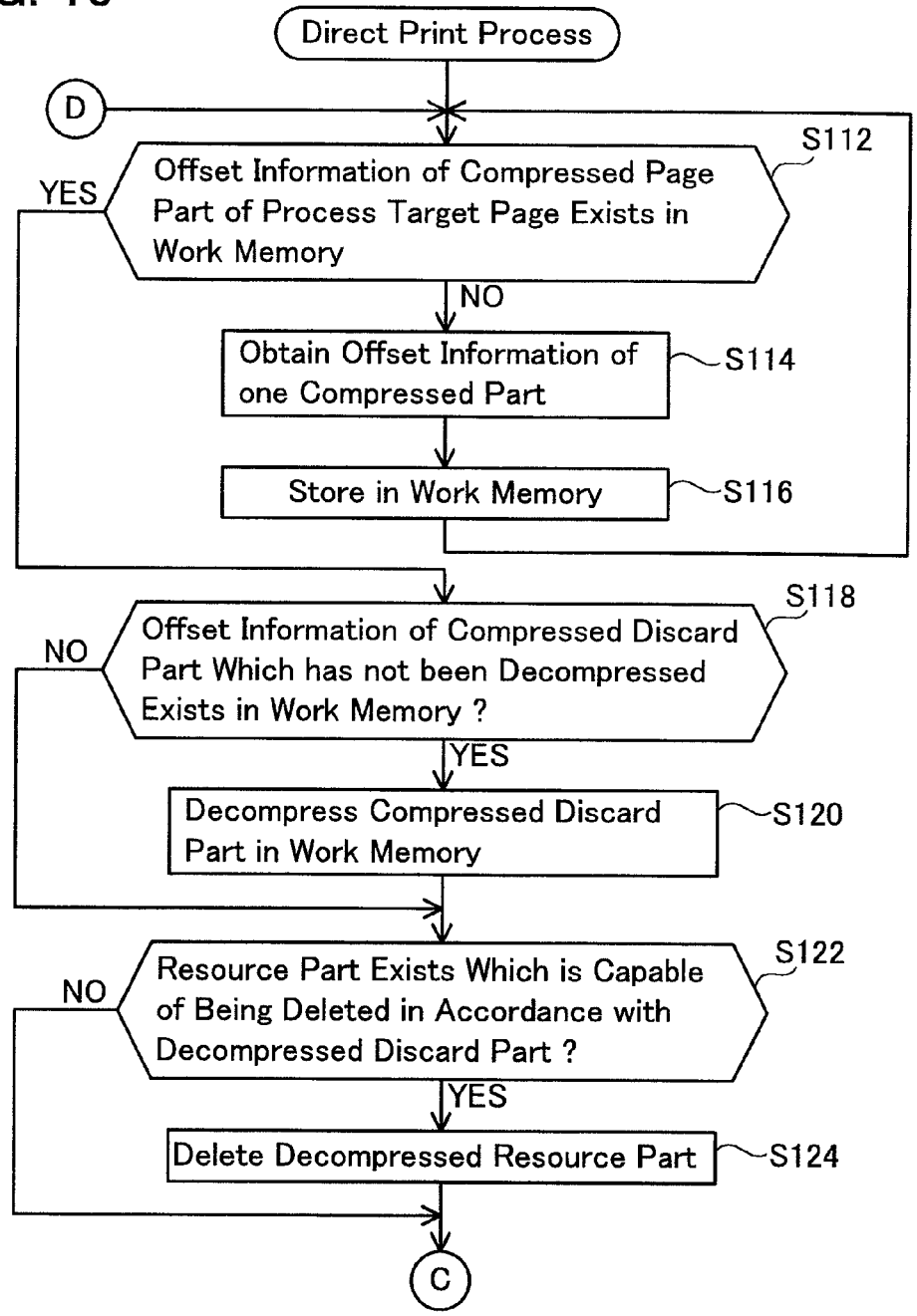
FIG. 10 shows a flowchart of a direct print process.
Figure 11:
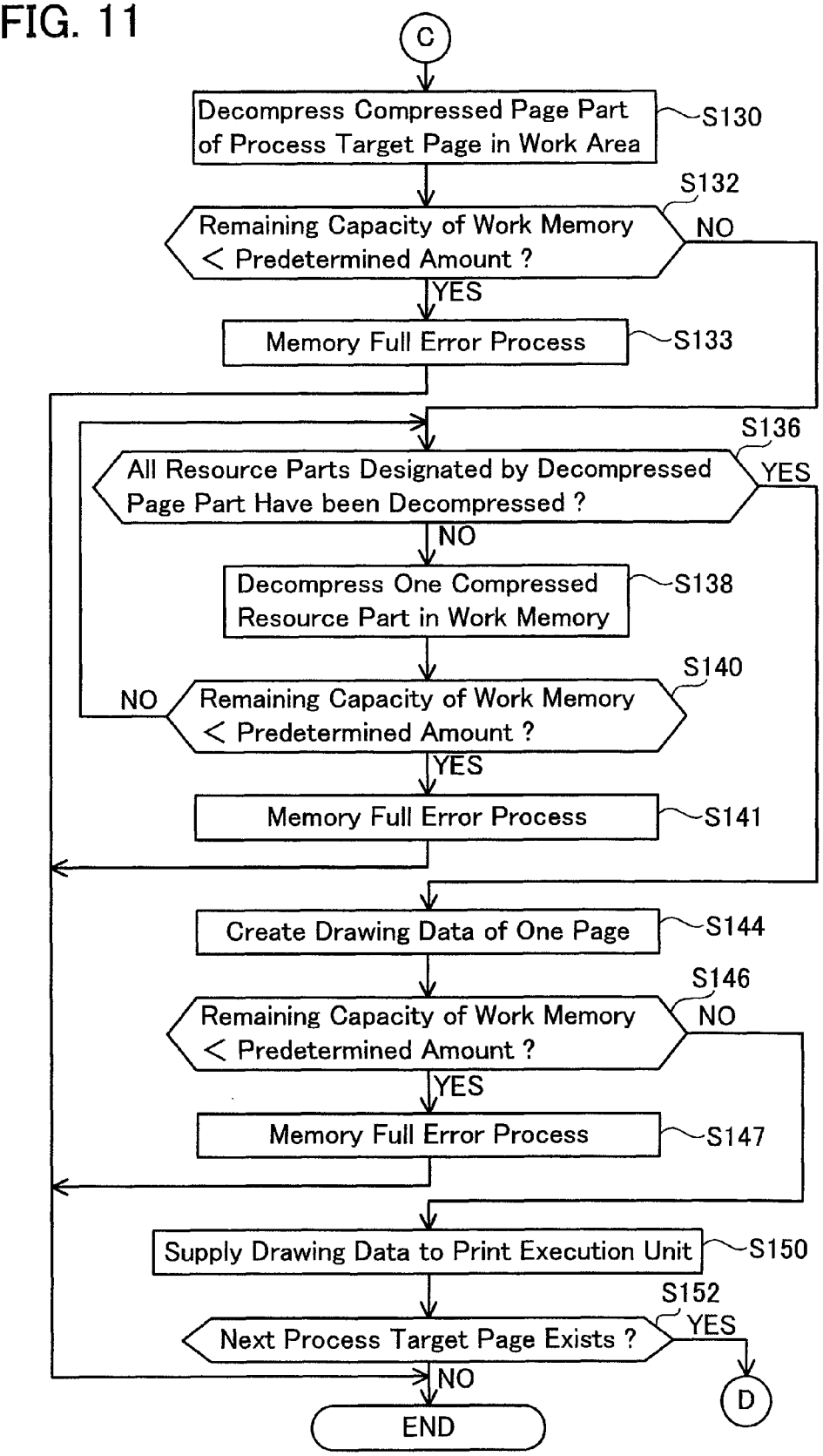
FIG. 11 shows a continuation of the flowchart of FIG. 10.

FIGS. 10 and 11 show a flowchart of a direct print process executed by the control unit 20. By operating the operation unit 14 (FIG. 1), the user can input, to the printer 10, an instruction to print in accordance with the PDL data 60 being stored in the USB memory 6. In this case, the control unit 20 executes the direct print process.

The PDL data 60 includes, for each of all the compressed parts, offset information relating to the compressed part. The offset information includes the file name of the compressed part, the address information of the compressed part in the USB memory 6, etc. The control unit 20 determines whether the offset information of the compressed page part of the process target page is present in the work memory 50 (S112). In a case of NO, the PDL data obtaining unit 26 obtains the offset information of one compressed part from the USB memory 6 (S114), and stores the offset information in the work memory 50 (S116). Upon ending S116, the control unit 20 returns to S112. The processes S114 and S116 are repeated until the offset information of the compressed page part of the process target page is obtained.

In a case of YES in S112, the control unit 20 determines whether offset information of the compressed discard part which has not been decompressed exists in the work memory 50 (S118). If the offset information of a specific compressed discard part exists in the work memory 50, but the decompressed discard part of the specific compressed discard part does not exist in the work memory 50, the control unit 20 determines YES in S118. In this case, the PDL data obtaining unit 26 specifies the address information of the specific compressed discard part in the USB memory 6 by reading the offset information of the specific compressed discard part. Next, the PDL data obtaining unit 26 obtains the specific compressed discard part from the USB memory 6 based on the specified address information. Next, the storage control unit 28 stores the specific compressed discard part in the work memory 50. Next, the control unit 20 creates a decompressed discard part in the work memory 50 by decompressing the specific compressed discard part (S120). Upon ending S120, or in a case of NO in S118, the control unit 20 proceeds to S122.

The process S122 is the same as the process S22 of FIG. 7. In S124, which is executed in a case of YES in S122, the deletion unit 32 specifies the file name of the compressed resource part indicated by the data information included in the specific decompressed discard part (the decompressed discard part including page information corresponding to the current process target page). Next, the deletion unit 32 deletes, from the work memory 50, the decompressed resource part created from the compressed resource part having the specified file name (S124). Upon ending S124, or in a case of NO in S122, the control unit 20 proceeds to S130 of FIG. 11.

In S130, the PDL data obtaining unit 26 specifies the address information of the compressed page part of the current process target page in the USB memory 6 by reading the offset information of the compressed page part of the current process target page. Next, the PDL data obtaining unit 26 obtains the compressed page part of the current process target page from the USB memory 6 based on the specified address information. Next, the storage control unit 28 stores the obtained compressed page part in the work memory 50. Next, the drawing data creation unit 30 creates a decompressed page part in the work memory 50 by decompressing the obtained compressed page part. The process S132 is the same as S32 of FIG. 8. In a case of YES in S132, the control unit 20 executes the memory full error process (S133). In this case, the drop print process ends. In a case of NO in S132, the control unit 20 proceeds to S136. In S136, the drawing data creation unit 30 obtains designation information (file name of the compressed resource part) included in the decompressed page part by reading the decompressed page part created in S130. Next, the drawing data creation unit 30 determines whether the compressed resource part having the file name indicated by the obtained designation information has been decompressed. In a case of NO, the PDL data obtaining unit 26 obtains, from the USB memory 6, the compressed resource part having the file name indicated by the obtained designation information. Next, the storage control unit 28 temporarily stores the obtained compressed resource part in the work memory 50. The drawing data creation unit 30 creates a decompressed resource part in the work memory 50 by decompressing the obtained compressed resource part (S138). The process S140 is the same as the process S40 of FIG. 8. In a case of YES in S140, the control unit 20 executes the memory full error process (S141). In this case, the drop print process ends. In a case of NO in S140, the deletion unit 32 deletes, from the work memory 50, the compressed resource part (the compressed resource part temporarily stored in the work memory 50) that is the source of the decompressed resource part created in S138. Note that the original compressed resource part continues to be retained in the USB memory 6. That is, the original compressed resource part is not deleted from the USB memory 6.

In the case of NO in S140, the control unit 20 returns to S136. In the case of YES in S136, the control unit 20 proceeds to S144. The processes S144 and S146 are the same as the processes S44 and S46 of FIG. 8. In a case of YES in S146, the control unit 20 executes the memory full error process (S147). The processes S150 and S152 executed in a case of NO in S146 are the same as the processes S50 and S52 of FIG. 8.

The data processing system 2 of the present embodiment has been explained in detail. In the case of drop printing, regardless of the timing indicated by the timing information 132, 162 ("2.fpage" "3.fpage" etc.) included in the compressed discard parts 130, 160, the deletion unit 32 deletes, from the work memory 50, the compressed resource parts 100, 110 being the deletion target as indicated by the data information 134, 164 ("image1," "font1") included in the compressed discard parts 130, 160 at a specific timing (the timing of S34, S42, or S48 of FIG. 8) subsequent to the aforementioned timing. In the deletion processes S34, S42, or S48 of FIG. 8, all the deletion target compressed resource parts 100, 110 may not necessarily be deleted. After the drop print process has ended, the deletion unit 32 deletes, from the work memory 50, all information remaining in the work memory 50 (information utilized in the drop print process). The compressed resource parts 100, 110 of the deletion target may also be deleted at this step. In this case, the specific timing becomes a timing after the drop print process ends.

In the drop print process of the present embodiment, for example, even in the case where the timing information 132 included in the compressed discard part 130 indicates a predetermined timing (2.fpage) that is prior to a correct timing at which deletion should be executed, the compressed image part 100 and the decompressed image part 108 of the deletion target are not deleted before creation is started of the drawing data of the second page indicated by the predetermined timing. The compressed image part 100 and decompressed image part 108 of the deletion target are deleted at the specific timing subsequent to the predetermined timing (e.g., in S34, S42, or S48 of FIG. 8 during creation of the drawing data of the third or subsequent pages). Consequently, the specific timing can become later than the correct timing. Consequently, it is possible to avoid the situation where it is impossible to create the drawing data due to delete the compressed image part 100 and decompressed image part 108 of the deletion target prior to the correct timing.

In the present embodiment, in the case of drop printing, the resource parts 100, 108, etc. are not deleted in accordance with the timing indicated by the timing information 132, 162 included in the compressed discard parts 130, 160, consequently processing time for executing this type of deletion is not required (the processing time is shorter for associating the flags 106a, 116a in S24 of FIG. 7). Consequently, the drawing data can be created rapidly in the case of drop printing.

In S24 of FIG. 7, the flag creation unit 34 writes the flags 106a, 116a to the header information 106, 116. At the specific timing, the deletion unit 32 deletes the resource parts 100, 108, etc. associated with the header information 106, 116 that includes the flags 106a, 116a. The deletion unit 32 may delete the resource parts 100, 108, etc. associated with the flags 106a, 116b without needing to read the decompressed discard parts 138, 168.

In the deletion process of FIG. 9, the deletion unit 32 deletes only the minimum number of resource parts in order to secure the remaining capacity of the work memory 50 necessary for decompressing the compressed page part to be decompressed in S30 or S38 of FIG. 8. Further, in the deletion process of FIG. 9, the deletion unit 32 deletes only the minimum number of resource parts in order to secure the remaining capacity of the work memory 50 necessary for creating one page of drawing data in S44 of FIG. 8. This has the effect that the timing at which the resource part is deleted is later than in a configuration that deletes all the resource parts associated with the flags 106a, 116a. Consequently, it is possible to avoid the situation where the drawing data cannot be created due to the deletion of the necessary resource part. As described above, in the deletion process executed in S34 or S42 of FIG. 8, only the minimum number of resource parts that would secure the necessary remaining capacity of the work memory 50 for decompressing a specific compressed part is deleted. Since the purpose of the decompression of the specific compressed part is to create the drawing data, the deletion process executed in S34 or S42 of FIG. 8 is also included in the configuration where "delete only a minimum number of sets of the drawing part data for securing a remaining capacity of the memory which is necessary for creating the specific drawing data among at least two target sets of the drawing part data being associated with the flag information".

Although not shown in the flowchart, if a first situation occurs in which drawing data is to be created utilizing the decompressed font part 118 after the compressed font part 110 and decompressed font part 118 have been deleted, the drawing data creation unit 30 creates the drawing data utilizing an alternate font. Further, in the present embodiment, the deletion unit 32 deletes the compressed font part 110 and decompressed font part 118 on a priority basis in the deletion process of FIG. 9. That is, in a case where the flags 106a, 116a are associated with both the compressed image part 100 and the compressed font part 110, the deletion unit 32 first deletes the compressed font part 110 and the decompressed font part 118. Even if the first situation were to occur due to this deletion process, the drawing data can be created utilizing the alternate font. Since the compressed font part 110 and decompressed font part 118 are deleted on the priority basis, the deletion of the compressed image part 100 and decompressed image part 108 will be delayed. Consequently, the occurrence of a second situation in which, after the compressed image part 100 and decompressed image part 108 have been deleted, the drawing data is to be created utilizing the decompressed image part 108 can be suppressed.

The memory monitoring unit 38 monitors whether the remaining capacity 52 of the work memory 50 has become less than the predetermined capacity. When the remaining capacity 52 of the work memory 50 has become less than the predetermined capacity, the deletion unit 32 deletes the deletion target resource parts 100, 108, etc. According to this configuration, in a case where the memory of the work memory 50 has become full, the remaining capacity 52 of the work memory 50 can be reserved.

In the case of direct printing, even if the printer 10 deletes a specific compressed resource part from the work memory 50, it can re-obtain the specific compressed resource part from the USB memory 6. Consequently, if a situation were to occur in which, after the specific compressed resource part and the decompressed resource part created from the specific compressed resource part have been deleted, the drawing data is to be created utilizing the decompressed resource part, the printer 10 can create the drawing data by re-obtaining the specific compressed resource part. In light of this circumstance, in the direct printing shown in FIGS. 10 and 11, the deletion unit 32 deletes (immediately after the decompression process S138 of FIG. 11) the specific compressed resource part when the specific compressed resource part has been decompressed. Further, the deletion unit 32 deletes, from the work memory 50, the decompressed resource part created from the specific compressed resource part in accordance with the timing indicated by the timing information included in the compressed discard part (S124 of FIG. 10). According to this configuration, the amount of work memory 50 used can be reduced.

(Second Embodiment)

Configurations differing from those of the first embodiment will be explained. In the present embodiment, after S24 of FIG. 7 has ended, the number monitoring unit 40 (FIG. 1) specifies the number of sets of header information 106, 116 including the flags 106a, 116a. Next, the number monitoring unit 40 determines whether the specified number exceeds a predetermined number (e.g., "3"). In a case of YES, the deletion unit 32 deletes, from the work memory 50, the plural sets of the header information 106, 116 including the flags 106a, 116a, the plural compressed resource parts 100, 110 associated with the plural sets of header information 106, 116, and the plural decompressed resource parts 108, 118 created from the plural compressed resource parts 100, 110. In the present embodiment, when the number of sets of header information 106, 116 including the flags 106a, 116a exceeds the predetermined number, all the resource parts associated with the flags 106a, 116a are deleted. In the present embodiment, as well, the deletion process of FIG. 9 is executed in the case of YES in S32 of FIG. 8, or in the case of YES in S40.

According to the present embodiment, when the number of resource parts associated with the flags 106a, 116a increases, these resource parts can be deleted. According to this configuration, reduction in speed of searching for resource part from the work memory 50 can be suppressed.

Variants of the aforementioned embodiments are given below.

(1) The technique of the aforementioned embodiments can also be applied in cases where types of PDL data other than XPS data are utilized. For example, the technique can also be applied in a case where PDF, PS (Post Script), etc. are utilized. Moreover, the term "PDL data" of the present specification is a concept including all types of data described utilizing the concept of a page.

(2) The process of writing the flags 106a, 116b in the header information 106, 116 can be changed to a process of writing the header information 106, 116 (or the compressed resource parts 100, 110) into a specific table. The present variant, also, is included in a configuration in which "associate flag information with the target set of the drawing part data". That is, the specific table can be considered as the flag information.

(3) In the deletion processes S34 and S42 of FIG. 8 of the first embodiment, all the compressed resource parts associated with the flags 106a, 116b may be deleted. Further, only a predetermined number (e.g., two) of compressed resource parts associated with the flags 106a, 116b may be deleted.

(4) In the second embodiment, not all the compressed resource parts associated with the flags 106a, 116b may be deleted if the number monitoring unit 40 has determined YES, but only a predetermined number (e.g., two) of compressed resource parts may be deleted.

(5) If YES has been determined in S22 of FIG. 7, the decompressed resource part designated by the decompressed discard part may be deleted (the compressed resource part is not deleted). If a situation occurs in which the decompressed resource part is needed after it has been deleted, the drawing data creation unit 30 can create the decompressed resource part by re-decompressing the original compressed resource part.

(6) The process S32 of FIG. 8 may be executed while executing S16 of FIG. 7. If YES is determined here (if the work memory 50 does not have remaining capacity for storing a single compressed part obtained in S14), the deletion process of FIG. 9 may be executed. Further, the process S32 of FIG. 8 may be executed while executing S20 of FIG. 7. If YES is determined here (if the work memory 50 does not have remaining capacity for decompressing the compressed discard part), the deletion process of FIG. 9 may be executed.

(7) The page memory 190 is utilized in the aforementioned embodiments. However, drawing data may be created utilizing a band memory. In this case, in S44 and S48 of FIGS. 8 (S144 and S148 of FIG. 11) the drawing data creation unit 30 may sequentially create a plurality of bands of drawing data, and, each time one band of drawing data is created, may supply the drawing data to the print execution unit 18.

(8) In the aforementioned embodiments, the page information 132, 162 of the compressed discard parts 130, 160, and the file name of the compressed page parts 120, 150, 180 include a page number (1, 2, etc.). However, the page information 132, etc. of the compressed discard part 130, etc., and the file name of the compressed page part 120, etc. may include a character string other than the page number. For example, the file name of the compressed page part 120 may be "a", the file name of the compressed page part 150 may be "b", and the file name of the compressed page part 180 may be "c". In this case, the page information 132 of the compressed discard part 130 may include "b", and the page information 162 of the compressed discard part 160 may include "c", The PDL data 80 may include process sequence information indicating the process sequence of "a" to "c". According to this configuration, the compressed page parts 120, 150, 180 can be processed in sequence, and the flags can be associated at a timing ("b" etc.) designated by the compressed discard parts 130, 160. The present variation, also, is included in a configuration in which "the timing information includes the page information," and a configuration in which "the page part data is associated with the page information."

(9) In the above embodiment, a plurality of units 26 to 40 is realized as a result of the CPU 22 executing processes according to the program stored in the program storage area 24. However, all of or a part of the plurality of units 26 to 40 may be realized by hardware such as logical circuits.

What is claimed is:

1. A PDL data processing device, comprising:
a processor; and
a program memory configured to store a computer-readable program therein, the computer-readable program, when executed by the processor, causing the PDL data processing device to function as:
a PDL data obtaining unit configured to obtain PDL data including plural sets of drawing part data and a set of deletion part data, the set of the deletion part data including timing information and data information, the timing information including page information, the data information indicating a target set of the drawing part data of a deletion target which is capable of being deleted at a timing indicated by the timing information, the timing being subsequent to a completion of a creation for drawing data of a page which is one page preceding a page corresponding to the page information and prior to a start of a creation for drawing data of the page corresponding to the page information;
a storage control unit configured to store the PDL data in a data memory;
a drawing data creation unit configured to create drawing data of a plurality of pages by utilizing the plural sets of the drawing part data;
a flag creation unit configured to associate flag information with the target set of the drawing part data being stored in the data memory, wherein the association is performed subsequent to the completion of the creation for the drawing data of the page which is one page preceding the page corresponding to the page information and prior to the start of the creation for the drawing data of the page corresponding to the page information; and
a deletion unit configured to delete from the data memory the target set of the drawing part data being associated with the flag information and being indicated by the data information included in the set of the deletion part data, regardless of the timing indicated by the timing information included in the set of the deletion part data, at a specific timing which is subsequent to the timing indicated by the timing information.

2. The PDL data processing device as in claim 1, wherein the deletion unit is configured to delete, at the specific timing at which a remaining capacity of the data memory becomes less than a predetermined capacity in a process of a creation for specific drawing data, only a minimum number of sets of the drawing part data for securing a remaining capacity of the data memory which is necessary for creating the specific drawing data among at least two target sets of the drawing part data being associated with the flag information.

3. The PDL data processing device as in claim 2, wherein the computer-readable program causes the PDL data processing device to further function as:
a determination unit,
wherein the deletion unit is configured to delete one target set of the drawing part data being associated with the flag information at the specific timing,
the determination unit is configured to determine, each time one target set of the drawing part data is deleted, whether the necessary remaining capacity of the data memory for creating the specific drawing data has been secured, and
the deletion unit is configured to delete another one target set of the drawing part data being associated with the flag information in a case where a negative determination is made by the determination unit.

4. The PDL data processing device as in claim 2, wherein the deletion unit is configured to delete on a priority basis, at the specific timing, the target set of the drawing part data including font information among the at least two target sets of the drawing part data being associated with the flag information.

5. The PDL data processing device as in claim 1, wherein the PDL data obtaining unit is configured to sequentially obtain the plural sets of the drawing part data, and
the flag creation unit is configured to specify the target set of the drawing part data from the obtained sets of the drawing part data, and associate the flag information with the specified target set of the drawing part data.

6. The PDL data processing device as in claim 1, wherein the computer-readable program causes the PDL data processing device to further function as:
a number monitoring unit configured to monitor that a number of target sets of the drawing part data being associated with the flag information exceeds a predetermined value,
wherein the deletion unit is configured to delete, at the specific timing at which the number exceeds the predetermined value, the target set of the drawing part data being associated with the flag information.

7. The PDL data processing device as in claim 1, wherein the computer-readable program causes the PDL data processing device to further function as:
a memory monitoring unit configured to monitor that a remaining capacity of the data memory becomes less than a predetermined capacity, and
the deletion unit is configured to delete, at the specific timing at which the remaining capacity of the data memory becomes less than the predetermined capacity, the target set of the drawing part data.

8. The PDL data processing device as in claim 1, wherein each of the plural sets of the drawing part data is compressed data,
the drawing data creation unit is configured to create a set of decompressed drawing part data in the data memory by decompressing a set of the drawing part data which is necessary for creating the drawing data of a target page, and create the drawing data of the target page by utilizing the set of the decompressed drawing part data, and
the deletion unit is configured to delete from the memory, at the specific timing, the target set of the drawing part data indicated by the data information included in the deletion part data, and a target set of the decompressed drawing part data which has been created from the target set of the drawing part data.

9. The PDL data processing device as in claim 1, wherein the plural sets of the drawing part data include a set of page part data and a set of resource part data,
the set of the page part data is associated with page information and includes designation information designating the set of the resource part data,
the drawing data creation unit is configured to create the drawing data of one page corresponding to the page information associated with the set of the page part data by utilizing the set of the page part data and the set of the resource part data designated by the designation information included in the set of the page part data, and
the target set of the drawing part data is the set of the resource part data.

10. The PDL data processing device as in claim 1, further comprising:
a first interface with which a communication cable is to be connected; and
a second interface with which an external storage device is to be directly connected,
wherein each of the plural sets of the drawing part data is compressed data,
the drawing data creation unit is configured to create a set of decompressed drawing part data in the data memory by decompressing a set of the drawing part data which is necessary for creating the drawing data of a target page, and create the drawing data of the target page by utilizing the set of the decompressed drawing part data, and
the deletion unit is configured to:
delete from the data memory, at the specific timing, the target set of the drawing part data indicated by the data information included in the set of the deletion part data, and a target set of the decompressed drawing part data which has been created from the target set of the drawing part data, in a case where the PDL data obtaining unit obtains the PDL data through the first interface; and
delete from the data memory the target set of the drawing part data when the target set of the drawing part data is decompressed, and delete from the data memory the target set of the decompressed drawing part data which has been created from the target set of the drawing part data in accordance with the timing indicated by the timing information included in the set of the deletion part data, in a case where the PDL data obtaining unit obtains the PDL data through the second interface.

11. A non-transitory computer readable medium storing a computer program, the computer program including instructions for ordering a computer to perform:
obtaining PDL data including plural sets of drawing part data and a set of deletion part data, the set of the deletion part data including timing information and data information, the timing information including page information, the data information indicating a target set of the drawing part data of a deletion target which is capable of being deleted at a timing indicated by the timing information, the timing being subsequent to a completion of a creation for drawing data of a page which is one page preceding a page corresponding to the page information and prior to a start of a creation for drawing data of the page corresponding to the page information;

storing the PDL data in a data memory;

creating drawing data of a plurality of pages by utilizing the plural sets of the drawing part data;

associating flag information with the target set of the drawing part data being stored in the data memory, wherein the association is performed subsequent to the completion of the creation for the drawing data of the page which is one page preceding the page corresponding to the page information and prior to the start of the creation for the drawing data of the page corresponding to the page information; and deleting from the data memory the target set of the drawing part data being associated with the flag information and being indicated by the data information included in the set of the deletion part data, regardless of the timing indicated by the timing information included in the set of the deletion part data, at a specific timing which is subsequent to the timing indicated by the timing information.

12. A PDL data processing device, comprising:

a first interface with which a communication cable is to be connected;

a second interface with which an external storage device is to be directly connected;

a processor; and a program memory configured to store a computer-readable program therein, the computer-readable program, when executed by the processor, causing the PDL data processing device to function as:

a PDL data obtaining unit configured to obtain PDL data including plural sets of drawing part data and a set of deletion part data, each of the plural sets of the drawing part data being compressed data, the set of the deletion part data including timing information and data information indicating a target set of the drawing part data of a deletion target which is capable of being deleted at a timing indicated by the timing information;

a storage control unit configured to store the PDL data in a data memory;

a drawing data creation unit configured to create drawing data of a plurality of pages by utilizing the plural sets of the drawing part data, wherein the drawing data creation unit is configured to create a set of decompressed drawing part data in the data memory by decompressing a set of the drawing part data which is necessary for creating the drawing data of a target page, and create the drawing data of the target page by utilizing the set of the decompressed drawing part data; and a deletion unit configured to:

delete from the data memory the target set of the drawing part data indicated by the data information included in the set of the deletion part data and a target set of the decompressed drawing part data which has been created from the target set of the drawing part data, regardless of the timing indicated by the timing information included in the set of the deletion part data, at a specific timing which is subsequent to the timing indicated by the timing information, in a case where the PDL data obtaining unit obtains the PDL data through the first interface; and delete from the data memory the target set of the drawing part data when the target set of the drawing part data is decompressed, and delete from the data memory the target set of the decompressed drawing part data which has been created from the target set of the drawing part data in accordance with the timing indicated by the timing information included in the set of the deletion part data, in a case where the PDL data obtaining unit obtains the PDL data through the second interface.

13. A non-transitory computer readable medium storing a computer program, the computer program including instructions for ordering a computer to perform:

obtaining PDL data including plural sets of drawing part data and a set of deletion part data, each of the plural sets of the drawing part data being compressed data, the set of the deletion part data including timing information and data information indicating a target set of the drawing part data of a deletion target which is capable of being deleted at a timing indicated by the timing information;

storing the PDL data in a data memory;

creating drawing data of a plurality of pages by utilizing the plural sets of the drawing part data;

creating a set of decompressed drawing part data in the data memory by decompressing a set of the drawing part data which is necessary for creating the drawing data of a target page, and create the drawing data of the target page by utilizing the set of the decompressed drawing part data;

deleting from the data memory the target set of the drawing part data indicated by the data information included in the set of the deletion part data and a target set of the decompressed drawing part data which has been created from the target set of the drawing part data, regardless of the timing indicated by the timing information included in the set of the deletion part data, at a specific timing which is subsequent to the timing indicated by the timing information, in a case where the PDL data is obtained through a first interface with which a communication cable is to be connected; and deleting from the data memory the target set of the drawing part data when the target set of the drawing part data is decompressed, and delete from the data memory the target set of the decompressed drawing part data which has been created from the target set of the drawing part data in accordance with the timing indicated by the timing information included in the set of the deletion part data, in a case where the PDL data is obtained through a second interface with which an external storage device is to be directly connected.

* * * * *